United States Patent
Nakakura et al.

(10) Patent No.: US 10,757,024 B2
(45) Date of Patent: Aug. 25, 2020

(54) LOAD DISTRIBUTION APPARATUS, LOAD DISTRIBUTION METHOD AND PROGRAM

(71) Applicant: NTT Communications Corporation, Chiyoda-ku (JP)

(72) Inventors: Toshiya Nakakura, Shinagawa-ku (JP); Sho Yamamura, Ota-ku (JP)

(73) Assignee: NTT Communications Corporation, Chiyoda-ku (JP)

( * ) Notice: Subject to any disclaimer, the term of this patent is extended or adjusted under 35 U.S.C. 154(b) by 296 days.

(21) Appl. No.: 15/538,026

(22) PCT Filed: Dec. 22, 2015

(86) PCT No.: PCT/JP2015/085887
§ 371 (c)(1),
(2) Date: Jun. 20, 2017

(87) PCT Pub. No.: WO2016/104537
PCT Pub. Date: Jun. 30, 2016

(65) Prior Publication Data
US 2018/0006952 A1    Jan. 4, 2018

(30) Foreign Application Priority Data
Dec. 24, 2014  (JP) ................. 2014-260297

(51) Int. Cl.
*H04L 12/803* (2013.01)
*G06F 13/00* (2006.01)
(Continued)

(52) U.S. Cl.
CPC ........... *H04L 47/125* (2013.01); *G06F 9/505* (2013.01); *G06F 9/5083* (2013.01); *G06F 13/00* (2013.01);
(Continued)

(58) Field of Classification Search
CPC ........ G06F 13/00; G06F 9/505; G06F 9/5083; H04L 43/0817; H04L 43/16; H04L 45/24;
(Continued)

(56) References Cited

U.S. PATENT DOCUMENTS 9,148,519 B1 * 9/2015 Judge ................... H04M 7/006
2004/0260745 A1 * 12/2004 Gage ................. H04L 29/12018
709/200

(Continued)

FOREIGN PATENT DOCUMENTS

| JP | 2006-135591 A | 5/2006 |
| JP | 2006-260177 A | 9/2006 |
| JP | 5544524 B2 | 7/2014 |

OTHER PUBLICATIONS

T. Takabatake, "A Scheme of Relay Server Selection Methods for NAT Traversal through Home Gateways," 2008 Australasian Telecommunication Networks and Applications Conference, Adelaide, SA, 2008, pp. 116-121, doi: 10.1109/ATNAC.2008.4783307. (Year: 2008).*

(Continued)

*Primary Examiner* — Christopher Biagini
(74) *Attorney, Agent, or Firm* — Oblon, McClelland, Maier & Neustadt, L.L.P.

(57) ABSTRACT

A load distribution apparatus connected, via a network, to a plurality of relay apparatuses that relay communication performed by a terminal, and to the terminal, including: storage means configured to store relay apparatus identifiers that identify each of the plurality of relay apparatuses, installation site information that indicates installation sites of each of the plurality of relay apparatuses, and load information that indicates loads of each of the plurality of relay apparatuses; load management means configured to collect the load information from each of the plurality of relay apparatuses to store the load information in the storage (Continued)

means; selection means configured, when receiving a request from the terminal, to select a relay apparatus for relaying communication performed by the terminal from among the plurality of relay apparatuses based on the installation site information or the load information; and transmission means configured to transmit, to the terminal that transmits the request, a relay apparatus identifier of the relay apparatus selected by the selection means.

12 Claims, 14 Drawing Sheets

(51) Int. Cl.
*H04L 29/08* (2006.01)
*H04L 12/707* (2013.01)
*G06F 9/50* (2006.01)
*H04L 12/26* (2006.01)
*H04L 12/743* (2013.01)
*H04L 29/06* (2006.01)

(52) U.S. Cl.
CPC .......... *H04L 43/0817* (2013.01); *H04L 45/24* (2013.01); *H04L 45/7453* (2013.01); *H04L 67/1027* (2013.01); *H04L 69/22* (2013.01); *H04L 43/16* (2013.01); *H04L 67/1008* (2013.01); *H04L 67/1029* (2013.01)

(58) Field of Classification Search
CPC ............... H04L 45/7453; H04L 47/125; H04L 67/1002; H04L 67/1004; H04L 67/1008; H04L 67/1019; H04L 67/1021; H04L 67/1027; H04L 67/1029; H04L 67/28; H04L 69/22
See application file for complete search history.

(56) References Cited

U.S. PATENT DOCUMENTS

| | | |
|---|---|---|
| 2005/0196286 A1 | 9/2005 | Xu et al. |
| 2005/0245263 A1* | 11/2005 | Ejzak ................ H04W 36/0022 455/445 |
| 2007/0165622 A1* | 7/2007 | O'Rourke ............ H04L 12/287 370/389 |
| 2009/0013324 A1 | 1/2009 | Gobara et al. |
| 2009/0022298 A1* | 1/2009 | Qiu ....................... H04L 47/125 379/211.01 |
| 2009/0073969 A1 | 3/2009 | Gobara et al. |
| 2009/0198772 A1* | 8/2009 | Kim .................... H04L 67/1095 709/203 |
| 2011/0040892 A1 | 2/2011 | Amemiya et al. |
| 2011/0093522 A1* | 4/2011 | Chen ................ H04L 29/12066 709/203 |
| 2011/0276695 A1* | 11/2011 | Maldaner .............. G06F 9/5083 709/226 |
| 2012/0239821 A1 | 9/2012 | Hozumi |
| 2014/0006579 A1* | 1/2014 | Pitsch ..................... H04L 67/02 709/223 |
| 2014/0280488 A1* | 9/2014 | Voit ....................... H04L 67/10 709/203 |

OTHER PUBLICATIONS

Extended European Search Report dated Jul. 6, 2018 in European Patent Application No. 15873105.9, citing documents AA, AB and AC therein, 11 pages.

International Search Report dated Apr. 5, 2016, in PCT/JP2015/085887, filed Dec. 22, 2015.

* cited by examiner

| RELAY APPARATUS IDENTIFIER | INSTALLATION SITE | SESSION IDENTIFIER |
|---|---|---|
| 192.0.2.15:3478 | SITE A | A-B |
| 192.0.2.16:3478 | SITE A | C-D, E-F |
| 192.1.2.15:3478 | SITE B | G-H |
| 192.1.2.16:3478 | SITE B | I-J |
| 192.2.2.15:3478 | SITE C | J-K, L-M, N-O |
| 192.2.2.16:3478 | SITE C | P-Q, R-S, T-U |

| RELAY APPARATUS IDENTIFIER | LOAD INFORMATION |
|---|---|
| 192.0.2.15:3478 | 20% |
| 192.0.2.16:3478 | 30% |

FIG.13

| INSTALLATION SITE | AREA INFORMATION |
|---|---|
| SITE A | JAPAN, KOREA, CHINA ··· |
| SITE B | ENGLAND, GERMANY, FRANCE ··· |
| SITE C | AMERICA, CANADA, BRAZIL ··· |

FIG.15

| INSTALLATION SITE | TERMINAL IDENTIFIER |
|---|---|
| SITE A | A, B, C |
| SITE B | D, E, F |
| SITE C | G, H, I |

LOAD DISTRIBUTION APPARATUS, LOAD DISTRIBUTION METHOD AND PROGRAM

TECHNICAL FIELD

The present invention relates to a load distribution apparatus, a load distribution method and a program.

BACKGROUND ART

P2P communication techniques in which direct communication is performed between two terminals are known. Here, in a case in which communication is performed between terminals using a P2P communication technique, there are cases where direct communication between terminals cannot be performed depending on configuration of a network to which the terminals are connected. For example, in a case in which two terminals belong to different private networks respectively, packets are discarded depending on the specification of NAT (Network Address Translation), so that direct communication between terminals cannot be performed.

In order to make it possible to perform P2P communication in such a case, there is a technique installing a relay apparatus on a public network to relay P2P communication performed between terminals via the relay apparatus.

However, when performing P2P communication of video or voice between terminals, a large communication band is required in general. Therefore, when relaying P2P communication of video or voice, a process load of the relay apparatus becomes large. Further, depending on the installation place of the relay apparatus, the communication route becomes long so that delay of communication becomes large, which deteriorates real-time property which is an advantage of P2P communication.

Here, as a technique for handling increase of process load of servers, there is a load distribution technique for performing load distribution, with respect to requests from terminals, by distributing the requests to any of a plurality of servers based on a virtual ID (Identifier) calculated by a hash function (refer to patent document 1, for example).

RELATED ART DOCUMENT

Patent Document

[PATENT DOCUMENT 1] JP5544524

SUMMARY OF THE INVENTION

Problem to be Solved by the Invention

However, the conventional load distribution techniques could not realize load distribution in consideration of an installation place of a relay apparatus in order not to damage real-time property which is an advantage of the P2P communication. Also, load distribution in consideration of a process load of the relay apparatus required when P2P communication of video or voice is performed could not be performed.

The disclosed technique is conceived in view of the above-mentioned points, and an object of the present invention is to provide a technique that makes it possible to perform proper load distribution in consideration of an installation place or a process load of a relay apparatus.

Means for Solving the Problem

The disclosed technique provides a load distribution apparatus connected, via a network, to a plurality of relay apparatuses that relay communication performed by a terminal, and to the terminal, including:

storage means configured to store relay apparatus identifiers that identify each of the plurality of relay apparatuses, installation site information that indicates installation sites of each of the plurality of relay apparatuses, and load information that indicates loads of each of the plurality of relay apparatuses;

load management means configured to collect the load information from each of the plurality of relay apparatuses to store the load information in the storage means;

selection means configured, when receiving a request from the terminal, to select a relay apparatus for relaying communication performed by the terminal from among the plurality of relay apparatuses based on the installation site information or the load information; and transmission means configured to transmit, to the terminal that transmits the request, a relay apparatus identifier of the relay apparatus selected by the selection means.

Effect of the Present Invention

According to a disclosed technique, a technique that makes it possible to perform proper load distribution in consideration of an installation place or a process load of a relay apparatus can be provided.

BRIEF DESCRIPTION OF THE DRAWINGS

FIG. 13 is a diagram showing an example of a target area management table;

FIG. 15 is a diagram showing an example of a specific terminal management table;

EMBODIMENTS FOR CARRYING OUT THE INVENTION

[First Embodiment]

In the following, an embodiment is described with reference to figures. In each figure, the same configuration parts are assigned the same reference symbols, and there is a case in which redundant description is not provided.

Note that, in the following description, P2P communication by a WebRTC (Web Real-Time Communication) technique is described as an example, however, the communication system in the first embodiment can be also applied to P2P communication using techniques other than the WebRTC. Also, the communication system in the first embodiment can be applied to communications other than P2P communication.

<Outline>

Figure 1:
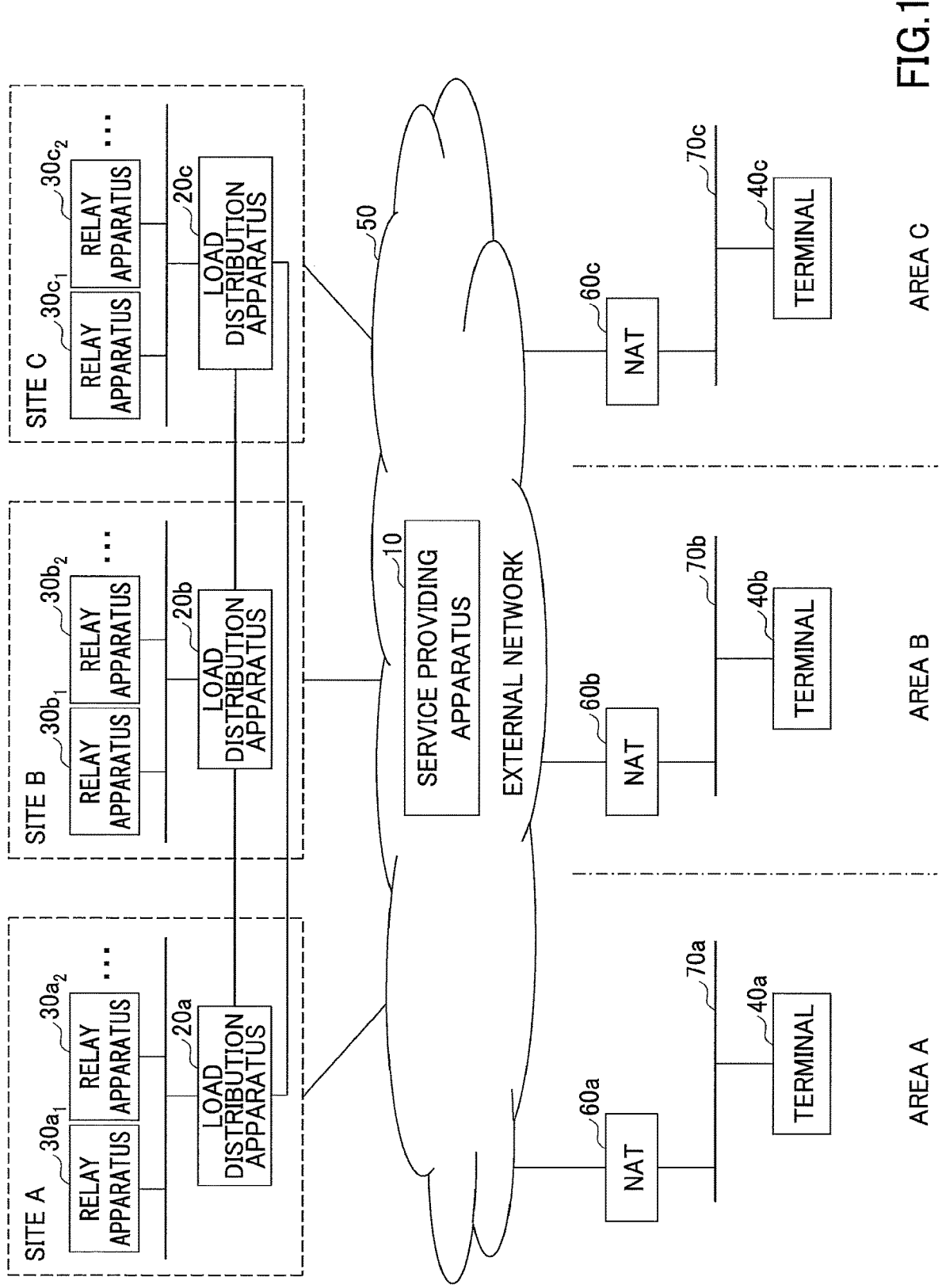
FIG. 1 is a diagram showing an example of a configuration of a communication system according to a first embodiment.

FIG. 1 is a diagram showing an example of a configuration of a communication system in the first embodiment. The communication system in the first embodiment includes a service providing apparatus 10, load distribution apparatuses (20a, 20b, 20c), relay apparatuses ($30a_1$, $30a_2$, $30b_1$, $30b_2$, $30c_1$, $30c_2$), terminals (40a, 40b, 40c) and NATs (60a, 60b, 60c).

In the following description, arbitrary load distribution apparatus of the load distribution apparatuses (20a, 20b, 20c) is referred to as "load distribution apparatus 20". Arbitrary relay apparatus of the relay apparatuses ($30a_1$, $30a_2$, $30b_1$, $30b_2$, $30c_1$, $30c_2$) is referred to as "relay apparatus 30". Arbitrary terminal of the terminals (40a, 40b, 40c) is referred to as "terminal 40". Arbitrary NAT of the NATs (60a, 60b, 60c) is referred to as "NAT 60".

Each of the load distribution apparatuses (20a, 20b, 20c), the relay apparatuses ($30a_1$, $30a_2$, $30b_1$, $30b_2$, $30c_1$, 30c2), the terminals (40a, 40b, 40c) and the NATs (60a, 60b, 60c) is connected to an external network 50. Also, the terminal 40a and the NAT 60a are connected to an internal network 70a, the terminal 40b and the NAT 60b are connected to an internal network 70b, and the terminal 40c and the NAT 60c are connected to an internal network 70c. The load distribution apparatuses (20a, 20b, 20c) are connected such that they can communicate with each other by a dedicated network.

The load distribution apparatus 20a and the relay apparatuses ($30a_1$, $30a_2$) are installed in the same site A. Similarly, the load distribution apparatus 20b and the relay apparatuses ($30b_1$, $30b_2$) are installed in the same site B, and the load distribution apparatus 20c and the relay apparatuses ($30c_1$, $30c_2$) are installed in the same site C. Note that, the communication system of the first embodiment is formed by three sites, however, for example, the communication system may be formed by one site or two sites, or by equal to or greater than four sites.

The terminal 40a and the NAT 60a exist in the same area A. In the same way, the terminal 40b and the NAT 60b exist in the same area B, and the terminal 40c and the NAT 60c exist in the same area C. Here, areas A~C indicate any areas in the whole world. It is assumed that areas A~C cover the whole world. For example, areas may be separated such that, the area A corresponds to Asia and Oceania, the area B corresponds to Europe and Africa, and the area C corresponds to North America and South America. Also, for example, the areas may be separated by countries such that the area A corresponds to Japan, Korea, China, . . . , the area B corresponds to England, Germany, France, . . . , the area C corresponds to America, Canada, Brazil, . . . .

FIG. 1 shows division into three areas, however, for example, division may be performed into two areas, or may be performed into equal to or greater than four areas. Also, FIG. 1 shows that the terminal 40 is connected to the internal network 70 of each area one by one, however, for example, a plurality of terminals 40 may be connected.

It is assumed that the internal network 70a, the internal network 70b, and the internal network 70c are physically separated, so that the terminal 40a, the terminal 40b, and the terminal 40c cannot directly communicate with each other. Therefore, when the terminal 40a communicates with an apparatus connected to the external network 50, the terminal 40a performs communication via the NAT 60a. Similarly, when the terminal 40b communicates with an apparatus connected to the external network 50, the terminal 40b performs communication via the NAT 60b, and when the terminal 40c communicates with an apparatus connected to the external network 50, the terminal 40c performs communication via the NAT 60c.

The service providing apparatus 10 is an apparatus that provides the terminal 40 with a service using P2P communication by the WebRTC technique. For example, the service providing apparatus 10 is a Web server. The service providing apparatus 10 transmits, to the terminal 40, in response to an access from the terminal 40, a client module (an HTML file including JavaScript(registered trade mark), for example) for realizing a predetermine service. The terminal 40 communicates with another terminal 40 by executing the received client module so as to be able to receive a service using P2P communication. As a concrete example of a service using P2P communication, for example, there are video chat, voice chat, text chat performed between two terminals 40.

The client module that the service providing apparatus 10 transmits to the terminal 40 includes a code for causing the terminal 40 to inquire of the load distribution apparatus 20 about a relay apparatus 30 used for relaying communication with a partner terminal 40. Accordingly, even when the terminal 40 that executes the client module is connected to a private network, the terminal 40 can perform communication with the partner terminal 40 via the relay apparatus 30 as necessary.

The load distribution apparatus 20 is an apparatus that is configured, in response to an inquiry from the terminal 40, to select an optimum relay apparatus 30 for relaying communication between the terminal 40 and the partner terminal 40 performing P2P communication. The load distribution apparatus 20 selects a small load relay apparatus 30 from among relay apparatuses 30 installed in a site the same as that of the load distribution apparatus 20 itself. Note that selecting a small load relay apparatus 30 is an example. A relay apparatus 30 may be selected based on load information not limited to the small load relay apparatus 30.

Also, the load distribution apparatuses (20a, 20b, 20c) have a function for sharing (synchronizing), with each other, information for associating communication performed between terminals 40 with the relay apparatus 30 that relays the communication.

Also, the load distribution apparatus 20 includes a function for increasing a new relay apparatus 30 in the same site in order to distribute load of the relay apparatus 30 when the load of the relay apparatus 30 is large. Further, the load distribution apparatus 20 includes a function for decreasing a relay apparatus 30 in the same site, when load of each of a plurality of relay apparatuses 30 is small, in consideration of operation cost reduction and the like of the relay apparatuses 30.

Also, the load distribution apparatuses (20a, 20b, 20c) are configured with a technique such as IP Anycast or DNS (Domain Name System) load balancing, for example, such that an inquiry to a load distribution apparatus 20 from the terminal 40 is routed to a load distribution apparatus 20 that is located in a site close to an area where the terminal 40 exists.

For example, a case is assumed in which the site A is Japan, the site C is America, and the area A is Asia and Oceania, and the area C is North America and South America. In the case in which the IP Anycast technique is used, each of the load distribution apparatuses (20a, 20b, 20c) includes the same IP address. In this case, when the terminal 40a existing in Japan accesses by designating an IP address of the load distribution apparatus 20, it is automatically routed to the load distribution apparatus 20a placed in the site A. Also, when the terminal 40c existing in Brazil accesses the load distribution apparatus 20, it is automatically routed to the load distribution apparatus 20c placed in the site C.

Accordingly, the load distribution apparatus 20 can determine that the terminal 40 accessing the load distribution apparatus 20 itself exits in an area close to the installation site of the load distribution apparatus 20.

Here, "close" is not limited to simply the case in which the distance on the map is close. For example, "close" may include a case of a route in which the number of routing hops is small, a case of a route of small delay, a case of a route of a wide band, a case of a route in which communication quality is stable, and a case of an economical route.

The relay apparatus 30 is an apparatus configured to relay P2P communication that is performed between terminals 40. For example, the relay apparatus 30 is a TURN (Traversal Using Relays around NAT) that is used in the WebRTC technique. When the relay apparatus 30 receives a request to relay communication from the terminal 40, the relay apparatus 30 transmits, to the terminal 40, an IP address and a port number used for relay of communication. The terminal 40 transmits, to the IP address and the port number received from the relay apparatus 30, a packet for transmission to a partner terminal 40. The relay apparatus 30 transfers the received packet to the terminal 40 of the communication partner so as to perform relay of communication performed between the terminals 40.

The terminal 40 is, for example, a communication apparatus such as a PC (Personal Computer) including a Web browser, a mobile phone, a smartphone or a tablet terminal and the like. By operating the client module received from the service providing apparatus 10, the terminal 40 can realize a predetermined service with the partner terminal 40. Note that the terminal 40 may be any communication apparatus as long as it can execute the client module received from the service providing apparatus 10.

The NAT 60 is an apparatus that is placed at a border point between the internal network 70 and the external network 50, and that performs conversion between the IP address used in the internal network 70 and the IP address used in the external network 50. Accordingly, it becomes possible to perform communication to an apparatus connected to the external network 50 from the terminal 40 connected to the internal network 70, and communication to the terminal 40 connected to the internal network 70 from the apparatus connected to the external network 50.

The external network 50 is a so-called public network, and for example, it is LAN, WAN or the Internet.

The internal network 70 is a private network constructed in a company or a home or the like, and it is LAN, WAN, for example.

Here, the WebRTC technique is briefly described. The WebRTC technique is a technique for realizing real-time P2P communication between Web browsers by performing P2P communication using Web browsers between two terminals 40. Generally, the terminal 40 including a Web browser is connected to a private network, so that direct communication between two terminals 40 cannot be performed in many cases. Therefore, the WebRTC technique makes it possible to perform direct communication between two terminals 40 even when the terminal 40 is connected to a private network, by utilizing an ICE (Interactive Connectivity Establishment) procedure.

More specifically, the ICE procedure provides a mechanism for notifying the terminal 40 of an IP address and a port number (that is, IP address and port number viewed from the Internet side) converted by the NAT 60 using the STUN (Session Traversal Utilities for NAT) server provided in the Internet side, and a mechanism for relaying P2P communication using a TURN server installed in the Internet side. Accordingly, the WebRTC technique makes it possible to perform direct communication between two terminals 40. Note that, since the concrete process procedure of the ICE procedure is a conventional technique, the description of it is not provided.

Next, operation outline of the communication system in the first embodiment is described by assuming that a video chat is performed using WebRTC between the terminal 40a and the terminal 40b. First, a user of the terminal 40a connects the terminal 40a to the service providing apparatus 10 to obtain an HTML file in which process contents for performing the video chat are described. In the same way, a user of the terminal 40b connects the terminal 40b to the service providing apparatus 10 to obtain an HTML file for performing the video chat. This HTML file includes a Javascript (registered trade mark) for obtaining, from the load distribution apparatus 20, an IP address and a port number (or a URL and a port number) of the TURN server that is used in WebRTC.

Next, the HTML files are executed by Web browsers installed in the terminal 40a and the terminal 40b. The terminal 40a inquires of the load distribution apparatus 20 about a relay apparatus 30 to be used for communication with the terminal 40b by the JavaScript (registered trade mark) included in the HTML file. The inquiry signal from the terminal 40a is routed to a load distribution apparatus 20a of a site corresponding to an area where the terminal 40a exists.

The load distribution apparatus 20 selects a proper relay apparatus 30 from among a plurality of relay apparatuses in the same site, and notifies the terminal 40a of the relay apparatus 30.

Next, in the same way as the terminal 40a, the terminal 40b inquires of the load distribution apparatus 20 about a relay apparatus 30 to be used for communication with the terminal 40a by the JavaScript (registered trade mark) included in the HTML file. The inquiry signal from the terminal 40b is routed to a load distribution apparatus 20b of a site corresponding to an area where the terminal 40b exists.

The load distribution apparatuses 20 are configured such that they share (synchronize), with each other, information for associating communication performed between terminals 40 and a relay apparatus 30 that relays the communication. Therefore, the load distribution apparatus 20 that receives the inquiry from the terminal 40b notifies, with respect to the request from the terminal 40b, the terminal 40b of the relay apparatus 30 that has been notified to the terminal 40a. This is because the terminal 40a and the terminal 40b need to use the same TURN server when relaying communication using a TURN server according to the specification of the TURN protocol.

<Hardware Configuration>

Figure 2:
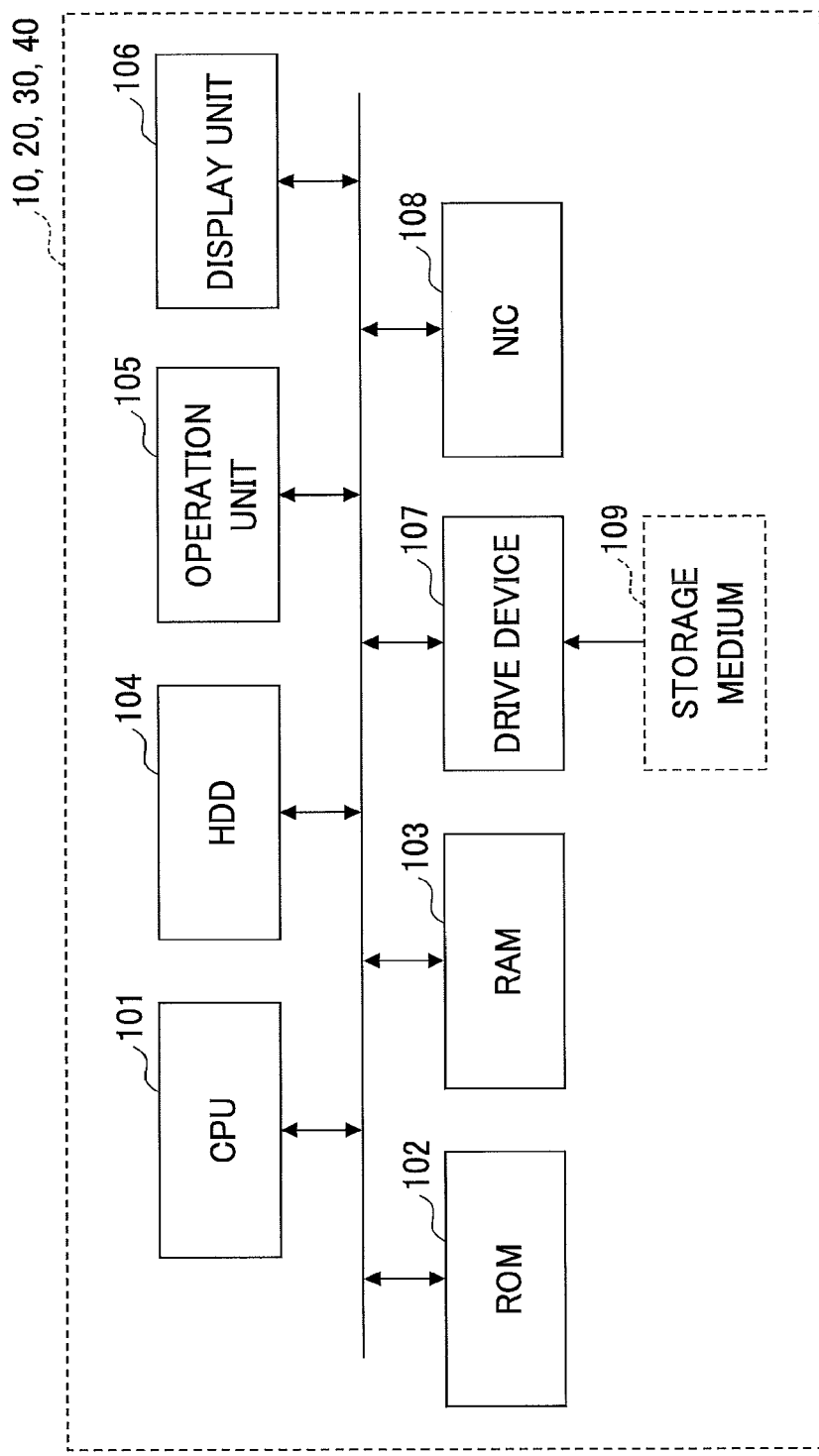
FIG. 2 is a diagram showing an example of a hardware configuration of a load distribution apparatus according to the first embodiment.

FIG. 2 is a diagram showing an example of a hardware configuration of the load distribution apparatus of the first embodiment. The load distribution apparatus 20 includes a CPU 101, a ROM 102, a RAM 103, an HDD 104, an operation unit 105, a display unit 106, a drive device 107 and a NIC (Network Interface card) 108.

The CPU 101 is a processor for performing control of the whole load distribution apparatus 20. The CPU 101 executes an operating system, an application, programs of various services and the like stored in the HDD 104 and the like to realize various functions of the load distribution apparatus 20. The ROM 102 stores various kinds of programs and data used by the programs and the like. The RAM 103 is used as a memory area for loading programs, a work area of the loaded programs and the like. The HDD 104 stores various kinds of information and programs and the like.

The operation unit 105 is hardware for receiving input operation from a user, and is, for example, a keyboard or a mouse. The display unit 106 is hardware for performing display to a user.

The drive device 107 reads a program from a storage medium 109 that records the program. The program read by the drive device 107 is installed in the HDD 104, for example. The NIC 108 is a communication interface that connects the load distribution apparatus 20 to a network, and that performs transmission and reception of data.

The storage medium 109 is a non-transitory storage medium. As examples of the storage medium 109, there are a magnetic storage medium, an optical disk, a magneto-optical storage medium, a non-volatile memory and the like.

The hardware configuration of each of the service providing apparatus 10, the relay apparatus 30 and the terminal 40 is the same as that shown in FIG. 2, for example. Thus, the description is not provided.

As hardware resources used for the load distribution apparatus 20 and the relay apparatus 30, hardware resources provided by a cloud service may be used, for example. Depending on the cloud service, it is possible to designate a site of hardware resource by which a server is created, so that it is possible to easily realize the load distribution apparatus 20 and the relay apparatus 30 that are used on the communication system of the first embodiment.

<Software Configuration>

(Load Distribution Apparatus)

Figure 3:
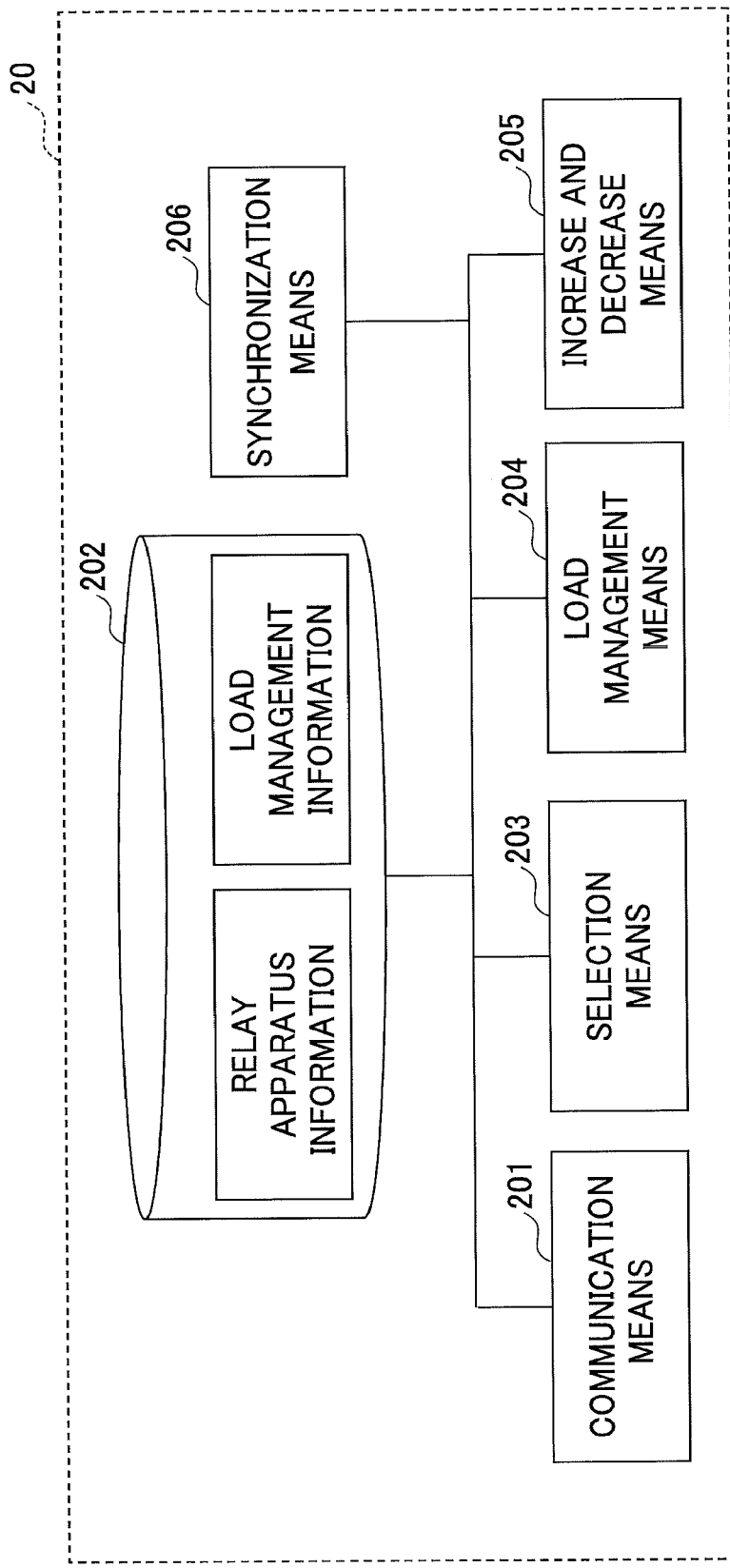
FIG. 3 is a diagram showing an example of a software configuration of a load distribution apparatus according to the first embodiment.

FIG. 3 is a diagram showing an example of a software configuration of the load distribution apparatus in the first embodiment. The load distribution apparatus 20 of the first embodiment includes a communication means 201, a storage means 202, a selection means 203, a load management means 204, an increase and decrease means 205 and a synchronization means 206. Each of these means can be realized by a process that one or more programs installed in the load distribution apparatus 20 causes the CPU 101 to execute.

The communication means 201 performs communication with the relay apparatus 30 or the terminal 40 via the NIC.

The storage means 202 can be realized by the RAM 103, the HDD 104 or a storage device and the like connected to the load distribution apparatus 20 via a network. The storage means 202 stores relay apparatus information and load management information. The relay apparatus information is information for managing the relay apparatus 30. The load management information is information for managing a load of the relay apparatus 30. Also, the storage means 202 stores installation sites of all load distribution apparatuses 20 that exist in the communication system of the first embodiment.

Figures 4, 5, 6:
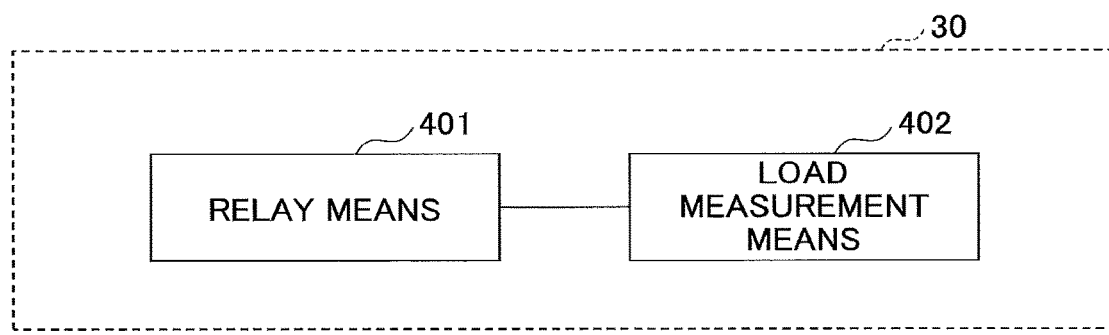
FIG. 4 is a diagram showing an example of a relay apparatus information table.
FIG. 5 is a diagram showing an example of a load management information table.
FIG. 6 is a diagram showing an example of a software configuration of a relay apparatus according to the first embodiment.

FIG. 4 is a diagram showing an example of the relay apparatus information table. The relay apparatus information table includes a relay apparatus identifier, an installation site and a session identifier.

The relay apparatus identifier is an identifier for uniquely identifying the relay apparatus 30, and is, for example, an IP address of the relay apparatus 30 and a port number (UDP/TCP:3478) of a communication port that a TURN server uses. Note that, as the relay apparatus identifier, other identifiers may be used as long as the relay apparatus 30 can be uniquely identified.

The installation site is an area where the relay apparatus 30 is installed. The session identifier is an identifier for uniquely identifying communication (session) performed between two terminals 40. For example, the session identifier is formed by a pair of terminal identifiers for uniquely identifying the terminals 40. FIG. 4 represents the terminal identifier by one character of alphabet (A, B, . . . , U), however, other identifiers may be used as long as the terminal 40 can be uniquely identified. For example, an IP address of the terminal 40, a telephone number of the terminal 40, a mail address registered for the terminal 40 and the like may be used.

By storing a session identifier in the relay apparatus information table by associating the session identifier with a relay apparatus identifier, it can be managed which relay apparatus 30 is assigned a role for relaying communication between which terminal 40 and which terminal 40. For example, in FIG. 4, a session identifier represented as "A-B" is registered in a record that includes a relay apparatus identifier which is "192.0.2.15:3478". This indicates that the relay apparatus 30 having "192.0.2.15:3478" as the relay apparatus identifier is assigned a role for relaying communication performed between a terminal 40 having A as the terminal identifier and a terminal 40 having B as the terminal identifier.

FIG. 5 is a diagram showing an example of the load management information table. The load management information table is a table for managing a load of the relay apparatus 30 that exists in an installation site the same as that of the load distribution apparatus 20. The load management information table includes a relay apparatus identifier and load information.

The load information is a process load of the relay apparatus 30, and is, for example, a CPU usage rate. Note that, as the load information, other indicators that indicate a process load of the relay apparatus 30 may be used.

Description continues returning back to FIG. 3.

When the selection means 203 receives, from the terminal 40, an inquiry (to be referred to as "relay apparatus inquiry request" hereinafter) about a relay apparatus 30 that is used for communication, the selection means 203 selects a relay apparatus 30 for relaying communication of the terminal 40 based on various information stored in the relay apparatus information table and load management information table. Also, the selection means 203 transmits a relay apparatus identifier of the selected relay apparatus 30 to the terminal 40.

The load management means 204 inquires of each of a plurality of relay apparatuses 30 that exist in an installation site the same as that of the load distribution apparatus 20 about load, and stores an inquiry result in the load management information table. For example, the load management means 204 may periodically inquire of the relay apparatus 30 about load, or may inquire of the relay apparatus 30 about load at a timing when receiving a request from the terminal 40.

Also, in a case in which the relay apparatus 30 is implemented by using a cloud service, the load management means 204 may inquire about load information via an API (Application Programming Interface) provided by the cloud service, instead of directly inquiring of each relay apparatus 30 about load.

The increase and decrease means 205 reads out load information of each of the relay apparatuses 30 managed in the relay apparatus information, and determines, based on a preset predetermined threshold, whether it is necessary to increase a new relay apparatus 30 or it is desirable to decrease an already installed relay apparatus 30.

For example, in a case in which a process load of every relay apparatus 30 installed in the same installation site is equal to or greater than a predetermined threshold (for example, CPU usage rate is 80%), the increase and decrease means 205 determines that increase of a relay apparatus 30 is necessary and increases the relay apparatus 30 at the installation site. On the other hand, in a case in which the process load of every relay apparatus 30 installed in the same installation site is equal to or less than a predetermined threshold (for example, CPU usage rate is equal to or less than 10%), the increase and decrease means 205 determines that decrease of a relay apparatus 30 is desirable, and selects one of a plurality of relay apparatuses 30 installed in the installation site to decrease it.

Note that, the increase and decrease means 205 increases a new relay apparatus 30 by installing, in unused hardware resource, an OS, a middleware, and an application of the relay apparatus 30 and the like. Also, the increase and decrease means 205 decreases a relay apparatus 30 by stopping an application of the already installed relay apparatus 30 and deleting the OS, the middleware, and the application of the relay apparatus 30 and the like. Note that, in the case in which the relay apparatus 30 is implemented by using a cloud service, the increase and decrease means 205 may perform increase or decrease of the relay apparatus 30 via an API (Application Programming Interface) provided by the cloud service.

The synchronization means 206 causes load distribution apparatuses 20 to share (synchronize) information that associates communication (session) performed between two terminals 40 with an relay apparatus 30 that relays the communication. More specifically, the synchronization means 206 performs synchronization by transmitting, to another load distribution apparatus 20, a session identifier and a relay apparatus identifier corresponding to the session identifier.

(Relay Apparatus)

FIG. 6 shows a diagram showing an example of a software configuration of the relay apparatus in the first embodiment. The relay apparatus 30 of the first embodiment includes a relay means 401 and a load measurement means 402. Each of these means can be realized by a process that one or more programs installed in the relay apparatus 30 causes the CPU 101 to execute.

The relay means 401 relays communication performed between two terminals 40 by performing communication with the terminals 40 via the NIC.

The load measurement means 402 receives an inquiry from the load distribution apparatus 20 to measure a load of the relay apparatus 30 at the time when receiving the inquiry. Also, the load measurement means 402 responds a measured value to the load distribution apparatus 20. A value to measure is, for example, CPU usage rate of the relay apparatus 30. Note that the value to measure is not limited to the CPU usage rate, and it may be a value represented by other indicators.

<Process Procedure>

Figure 7:
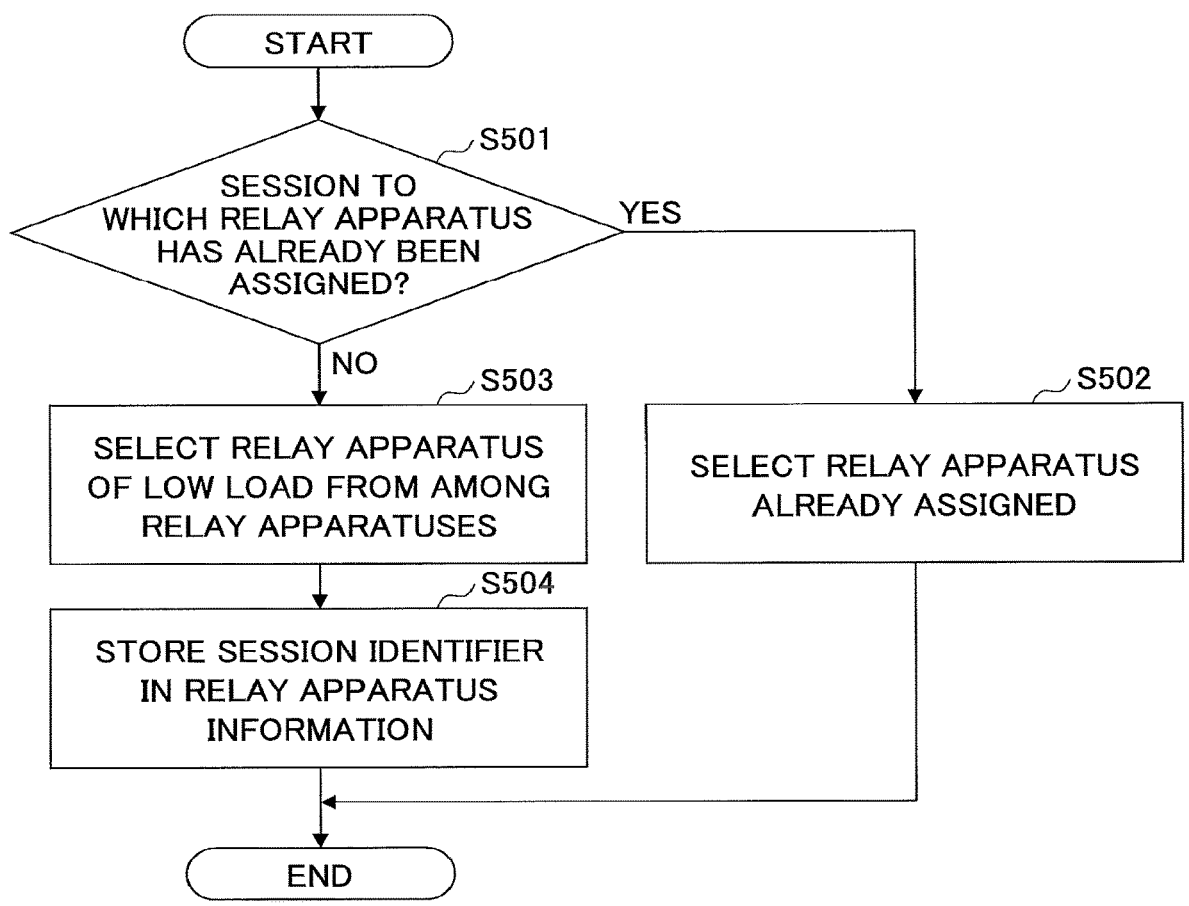
FIG. 7 is a flowchart showing an example of a process procedure for selecting a relay apparatus according to the first embodiment.

FIG. 7 is a flowchart showing an example of a proves procedure for selecting a relay apparatus according to the first embodiment. A process procedure for the load distribution apparatus 20 to select a relay apparatus 30 is described using FIG. 7.

In step S501, when the selection means 203 receives a relay apparatus inquiry request from a terminal 40, the selection means 203 generates a session identifier by extracting a terminal identifier of the terminal 40 itself that transmits the relay apparatus inquiry request and a terminal identifier of a terminal 40 that is a communication partner of the terminal 40 from the relay apparatus inquiry request. Next, the selection means 203 checks whether a record having the generated session identifier exists in the relay apparatus information table.

When the record having the generated session identifier exists in the relay apparatus information table, the selection means 203 determines that it is a session in which a relay apparatus 30 has already been assigned, so that the process goes to a process procedure of step S502. On the other hand, when the record having the generated session identifier does not exist in the relay apparatus information table, the selection means 203 determines that it is a session in which a relay apparatus 30 needs to be newly assigned, so that the process goes to a process procedure of step S503.

In step S502, the selection means 203 searches the relay apparatus information table to select a relay apparatus 30 by extracting a relay apparatus identifier from a record having the session identifier generated in step S501.

In step S503, the selection means 203 selects a relay apparatus 30 of the lowest load from among a plurality of relay apparatuses 30 existing in the installation site the same as that of the load distribution apparatus 20, by using the relay apparatus information table and the load management information table, and transmits a relay apparatus identifier of the selected relay apparatus 30 to the terminal 40 which is a transmissions source of the relay apparatus inquiry request received in step S501.

Note that the communication system of the first embodiment uses a technique such as IP Anycast. Accordingly, the selection means 203 can determine that the terminal 40 that transmits the relay apparatus inquiry request exists in an area close to the installation site of the selection means 203 itself. Therefore, the selection means 203 is configured to select a relay apparatus 30 of the lowest load from among relay apparatuses 30 installed in an installation site the same as that of itself in the process procedure of step S503.

In step S504, the selection means 203 stores the session identifier, generated in step S501, in a record of the relay apparatus 30 selected in step S503 from among records of the relay apparatus information table.

In the above, the process procedure for the selection means 203 to select a relay apparatus 30 has been described. Next, by using FIG. 8, a process procedure is described until each of the terminal 40a and the terminal 40b starts communication by inquiring of the load distribution apparatus 20 about a relay apparatus 30 to use for the communication.

Figure 8:
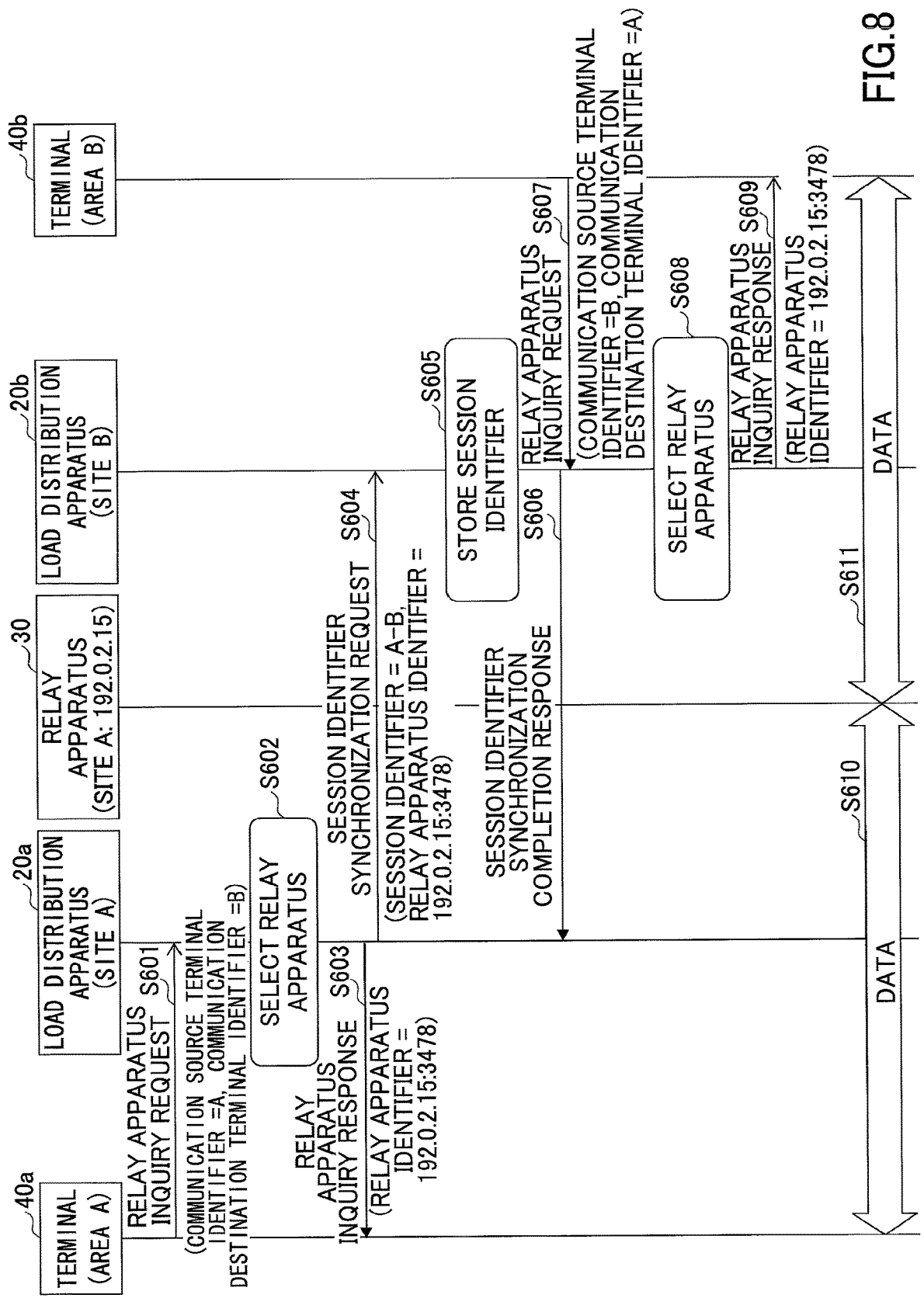
FIG. 8 is a sequence diagram showing an example of a process procedure of a communication system according to the first embodiment.

FIG. 8 is a sequence diagram showing an example of a process procedure of the communication system in the first embodiment. Note that FIG. 8 assumes a case in which the terminal 40a inquires of the load distribution apparatus 20 about a relay apparatus 30 before the terminal 40b, however, similar process procedure can be applied also for a case where the terminal 40b inquires of the load distribution apparatus 20 about a relay apparatus 30 before the terminal 40a.

In step S601, the terminal 40a transmits a relay apparatus inquiry request to the load distribution apparatus 20. The relay apparatus inquiry request includes a terminal identifier (A) of the terminal 40a itself and a terminal identifier (B) of the terminal 40b which is a communication partner of the terminal 40a. Note that the communication system of the first embodiment is configured such that an access from the terminal 40 exiting in the area A is routed to the load distribution apparatus 20a installed in the site A. Therefore, the relay apparatus inquiry request transmitted by the terminal 40a is routed to the load distribution apparatus 20a installed in the site A.

In step S602, the selection means 203 of the load distribution apparatus 20a selects a relay apparatus 30 used for the terminal 40a to communicate with the terminal 40b by the process procedure described in FIG. 7.

In step S603, the selection means 203 of the load distribution apparatus 20a transmits a relay apparatus inquiry response to the terminal 40a. The relay apparatus inquiry response includes a relay apparatus identifier (192.0.2.15:3478) of the relay apparatus 30 selected in step S602.

In step S604, the synchronization means 206 of the load distribution apparatus 20a transmits a session identifier synchronization request to all load distribution apparatuses 20 other than itself. The session identifier synchronization request includes a session identifier (A-B) registered in the relay apparatus information table in the process of step S602 and a relay apparatus identifier (192.0.2.15:3478) of the relay apparatus 30 selected in the process of step S602.

In step S605, the synchronization means 206 of the load distribution apparatus 20b checks whether the relay apparatus identifier (192.0.2.15:3478) included in the received session identifier synchronization request exists in the relay apparatus information table. When the record exists, the synchronization means 206 of the load distribution apparatus 20b stores the received session identifier (A-B) in the record. When the record does not exist, the synchronization means 206 of the load distribution apparatus 20b adds a new record to the relay apparatus information table. Also, the synchronization means 206 of the load distribution apparatus 20b stores, in the record, the relay apparatus identifier (192.0.2.15:3478) included in the received session identifier synchronization request, the received session identifier (A-B), and the installation site (site A) of the load distribution apparatus 20a that is a transmission source of the session identifier synchronization request. The installation site (site A) of the load distribution apparatus 20a can be determined from information stored in the storage means 202.

In step S606, the synchronization means 206 of the load distribution apparatus 20b transmits a session identifier synchronization complete response to the load distribution apparatus 20a in order to notify the load distribution apparatus 20a of completion of synchronization of the session identifier.

In step S607, the terminal 40b transmits a relay apparatus inquiry request to the load distribution apparatus 20b. The relay apparatus inquiry request includes a terminal identifier (B) of the terminal 40b itself and a terminal identifier (A) of the terminal 40a which is a communication partner of the terminal 40b. The communication system of the first embodiment is configured such that an access from the terminal 40 exiting in the area B is routed to the load distribution apparatus 20b installed in the site B. Therefore, the relay apparatus inquiry request transmitted by the terminal 40b is routed to the load distribution apparatus 20b installed in the site B.

In step S608, the selection means 203 of the load distribution apparatus 20b selects a relay apparatus 30 used for the terminal 40b to communicate with the terminal 40a by the process procedure described in FIG. 7. Note that, according to the process of step S605, the session identifier indicating communication between the terminal 40a and the terminal 40b has already been stored in the relay apparatus information table. Therefore, the selection means 203 of the load distribution apparatus 20b selects a relay apparatus 30 the same as the relay apparatus 30 notified from the load distribution apparatus 20a to the terminal 40a.

In step S609, the selection means 203 of the load distribution apparatus 20b transmits a relay apparatus inquiry response to the terminal 40b. The relay apparatus inquiry response includes a relay apparatus identifier (192.0.2.15:3478) of the relay apparatus 30 selected in step S608.

In step S610 and step S611, the terminal 40a and the terminal 40b transmit a packet to an IP address and a port designated by the relay apparatus identifier according to the communication procedure specified by the TURN protocol so as to establish a tunnel with the relay apparatus 30. The relay apparatus 30 transfers data received from the terminal 40a and the data received from the terminal 40b to the terminal 40b and the terminal 40a respectively to relay communication performed between the terminal 40a and the terminal 40b.

In the above, the process procedure has been described until each of the terminal 40a and the terminal 40b starts communication by inquiring of the load distribution apparatus 20 about the relay apparatus 30 to use for communication. Next, a process procedure for the load distribution apparatus 20 to increase the relay apparatus 30 is described using FIG. 9.

Figure 9:
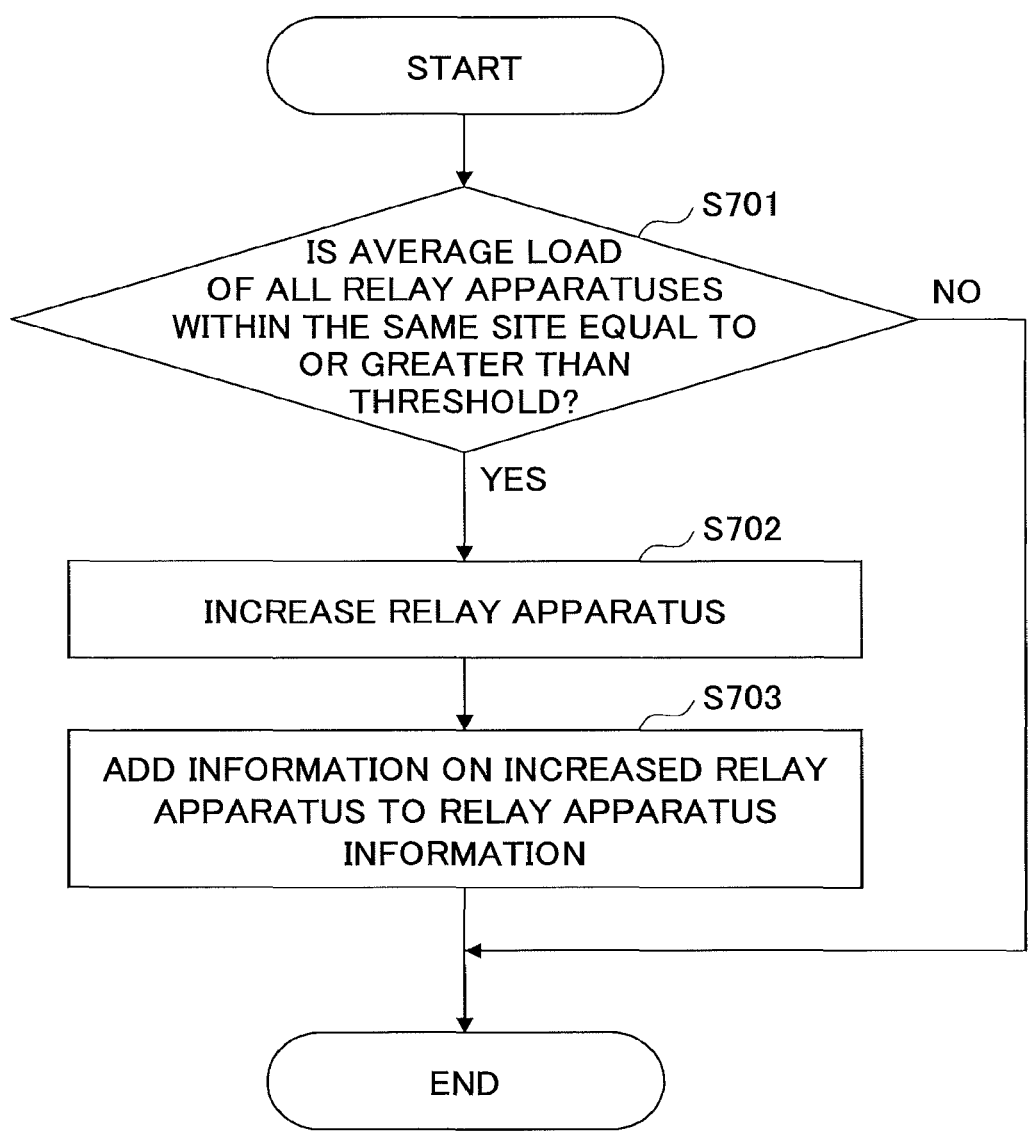
FIG. 9 is a flowchart showing an example of a process procedure for increasing a relay apparatus according to the first embodiment.

FIG. 9 shows a flowchart indicating an example of a process procedure for increasing a relay apparatus according to the first embodiment. The increase and decrease means 205 of the load distribution apparatus 20 may perform the process procedure shown in FIG. 9 at any timing or may periodically perform the process procedure.

In step S701, the increase and decrease means 205 extracts a load of each of the plurality of relay apparatuses 30 installed in a site the same as that of the load distribution apparatus 20 from the load management information table. Next, the increase and decrease means 205 obtains an average load by calculating an average value of the extracted loads to determine whether the obtained average load is equal to or greater than a threshold. When the obtained average load is equal to or greater than the threshold, the process goes to the process procedure of step S702, and when the obtained average load is less than the threshold, the process ends.

Instead of determining whether the average load is equal to or greater than a threshold, the increase and decrease means 205 may proceed to the process procedure of step S702 when the load of each of all relay apparatuses 30 installed in the site the same as that of the load distribution apparatus 20 is equal to or greater than a predetermined threshold.

In step S702, the increase and decrease means 205 increases a new relay apparatus 30 in the site the same as that of the load distribution apparatus 20 by installing an OS, a middleware, and an application of the relay apparatus 30 and the like in unused hardware resource.

In step S703, the increase and decrease means 205 adds a new record in the relay apparatus information table and stores, in the record, a relay apparatus identifier and an installation site of the relay apparatus 30 increased in step S702. Also, the increase and decrease means 205 adds a new record in the load management information table, and stores, in the record, a relay apparatus identifier of the relay apparatus 30 increased in step S702.

In the above, the process procedure for the load distribution apparatus 20 to increase the relay apparatus 30 has been described. Next, a process procedure for the load distribution apparatus 20 to decrease the relay apparatus 30 is described using FIG. 10.

Figure 10:
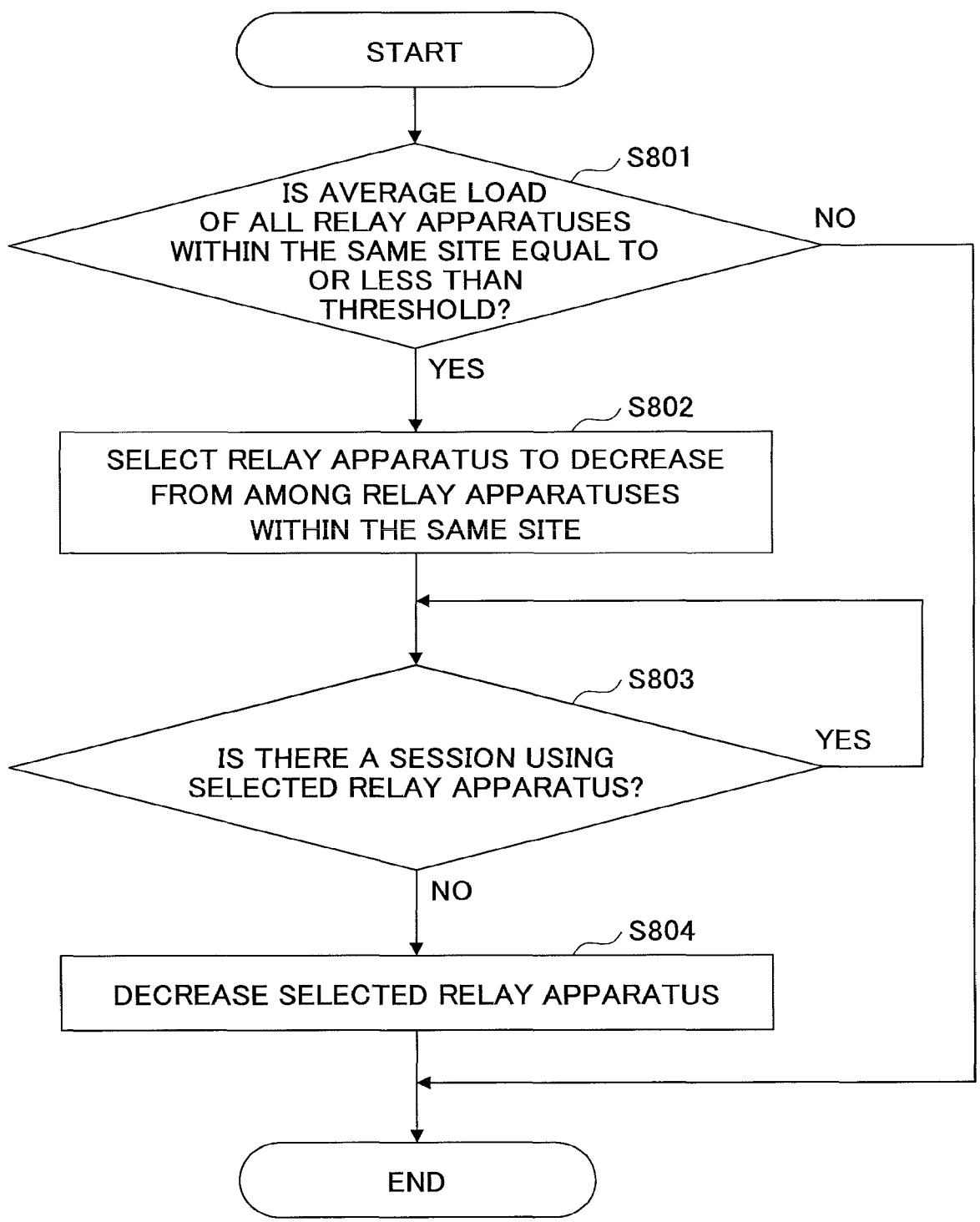
FIG. 10 is a flowchart showing an example of a process procedure for decreasing a relay apparatus according to the first embodiment.

FIG. 10 shows a flowchart indicating an example of a process procedure for decreasing a relay apparatus according to the first embodiment. The increase and decrease means 205 of the load distribution apparatus 20 may perform the process procedure shown in FIG. 10 at any timing or may periodically perform the process procedure.

In step S801, the increase and decrease means 205 extracts a load of each of the plurality of relay apparatuses 30 installed in a site the same as that of the load distribution apparatus 20 from the load management information table. Next, the increase and decrease means 205 obtains an average load by calculating an average value of the extracted loads to determine whether the obtained average load is equal to or less than a threshold. When the obtained average load is equal to or less than the threshold, the process goes to the process procedure of step S802, and when the obtained average load exceeds the threshold, the process ends.

In step S802, the increase and decrease means 205 selects a relay apparatus 30 of a decrease target from among a plurality of relay apparatuses 30 installed in a site the same as that of the load distribution apparatus 20. The increase and decrease means 205 may select any relay apparatus 30 as the relay apparatus to decrease, or may select, as the relay apparatus 30 to decrease, a relay apparatus 30 in which the number of assigned session identifiers is the smallest.

In step S803, the increase and decrease means 205 checks whether there is (are) one or more session identifiers assigned to the relay apparatus 30 selected as the relay apparatus 30 to decrease from the relay apparatus information table. When there is (are) one or more assigned session identifiers, the increase and decrease means 205 waits until the number of the assigned session identifier becomes 0. The reason is that there is a fear that communication performed between terminals 40 is disconnected by decreasing the relay apparatus 30. When the number of the assigned session identifier is 0, the process goes to the process procedure of step S804. The increase and decrease means 205 may forcibly proceed to the process procedure of step S804 without performing the process procedure of step S803.

In step S804, the increase and decrease means 205 decreases the relay apparatus 30 selected as the relay apparatus to decrease by stopping an application of the relay apparatus 30 and deleting the OS, the middleware, and the application of the relay apparatus 30.

In the above, the process procedure for the load distribution apparatus 20 to decrease the relay apparatus 30 has been described.

<Process Procedure (Modified Example 1)>

Here, a process procedure of a modified example 1 of the first embodiment is described. When the load distribution apparatus 20 in the modified example 1 of the first embodiment receives a relay apparatus inquiry request from the terminal 40, the load distribution apparatus 20 checks a load of each of all relay apparatuses 30 installed in an installation site the same as that of the load distribution apparatus 20. As a result of the check, when the load (or an average value of loads) of each of all relay apparatuses 30 exceeds a predetermined threshold, the load distribution apparatus 20 increases a new relay apparatus 30 in the installation site the same as that of the load distribution apparatus 20, and selects the increased new relay apparatus 30 to respond it to the terminal 40.

In the following, a concrete process procedure is described using a figure.

Figure 11:
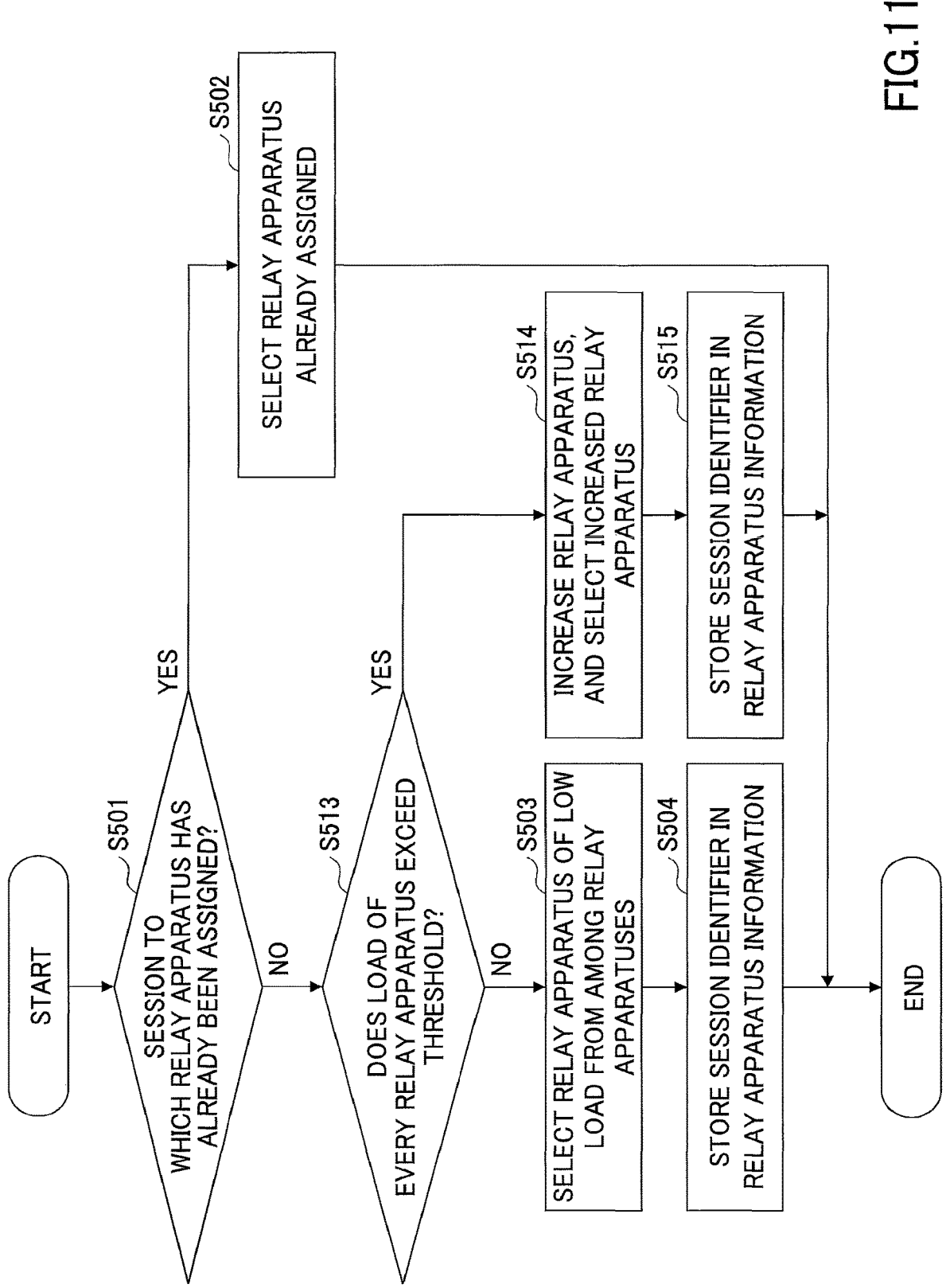
FIG. 11 is a flowchart showing an example of a process procedure (modified example 1) for selecting a relay apparatus according to the first embodiment.

FIG. 11 is a flowchart showing an example of a process procedure (modified example 1) for selecting a relay apparatus in the first embodiment. Since the process procedure from step S501 to S504 of FIG. 11 are the same as those in FIG. 7, the description is not provided.

In step S513, the selection means 203 checks a load of each of all relay apparatuses 30 installed in an installation site the same as that of the load distribution apparatus 20 using the relay apparatus information table and the load management information table. When the load of each of all relay apparatuses 30 exceeds a predetermined threshold, the process goes to the process procedure of step S514. When the load of at least one or more relay apparatuses 30 in the loads of all relay apparatuses 30 does not exceed the predetermined threshold, the process goes to the process procedure of step S503.

In step S514, the selection means 203 instructs the increase and decrease means 205 to increase a relay apparatus 30. The increase and decrease means 205 that receives the instruction increases a new relay apparatus 30 at the site the same as that of the load distribution apparatus 20 by installing an OS, a middleware, an application of the relay apparatus 30 and the like in unused hardware resource. Also, the increase and decrease means 205 adds a new record in the relay apparatus information table.

In step S515, the selection means 203 stores the session identifier generated in step S501 in a record of the relay apparatus 30 increased in step S514 of records of the relay apparatus information table.

In the above, the process procedure in the modified example 1 of the first embodiment has been described.

<Process Procedure (Modified Example 2)>

Nest, a process procedure of a modified example 2 of the first embodiment is described.

When the load distribution apparatus 20 in the modified example 2 of the first embodiment receives a relay apparatus inquiry request from the terminal 40, the load distribution apparatus 20 checks a load of each of all relay apparatuses 30 installed in an installation site the same as that of the load distribution apparatus 20. As a result of the check, when the load (or an average value of loads) of each of all relay apparatuses 30 exceeds a predetermined threshold, the load distribution apparatus 20 selects a relay apparatus in which the load is equal to or less than a predetermined threshold from among a plurality of relay apparatuses 30 installed in an installation site different from that of the load distribution apparatus 20.

In the following, a concrete process procedure is described using a figure.

Figure 12:
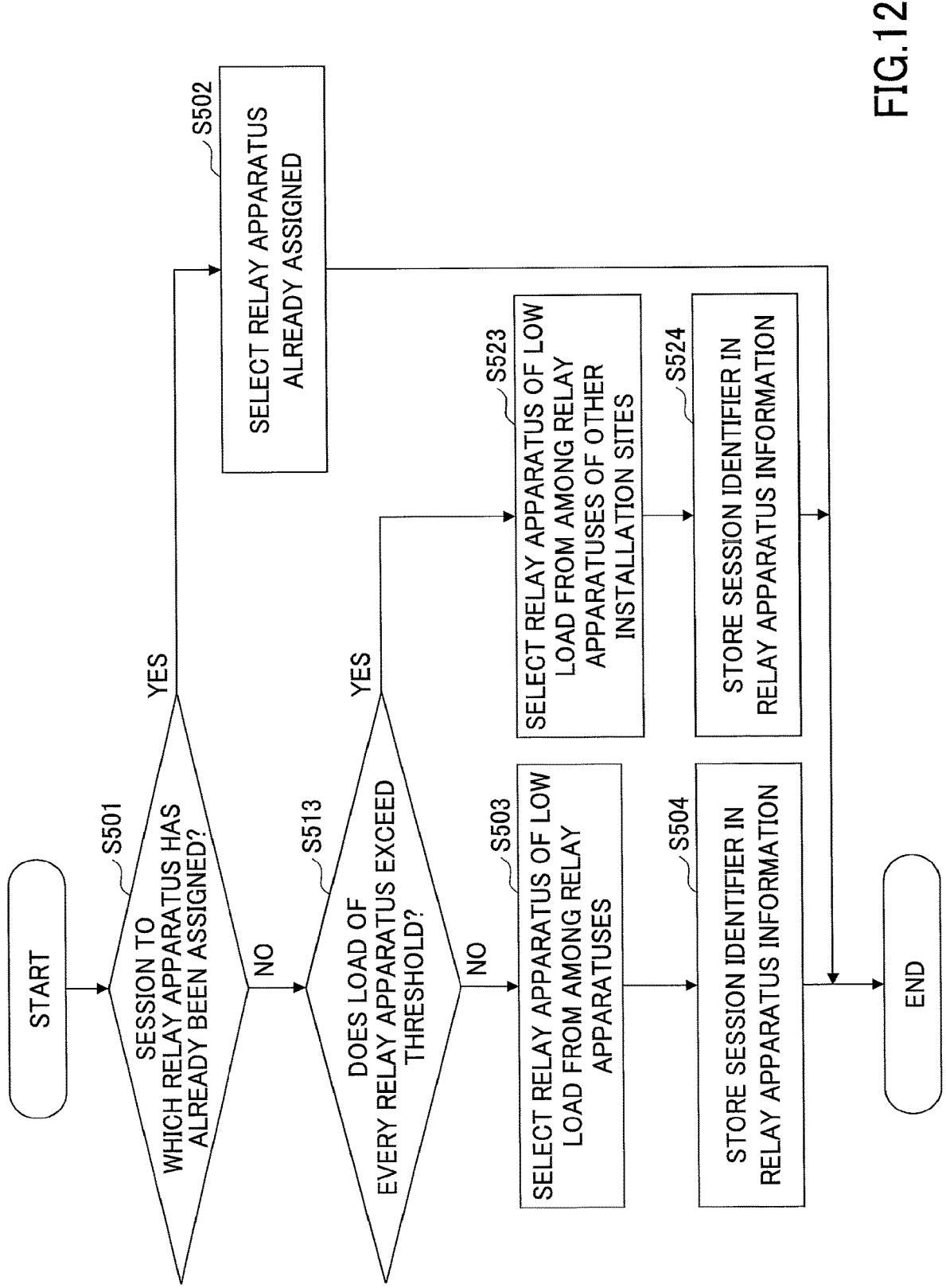
FIG. 12 is a flowchart showing an example of a process procedure (modified example 2) for selecting a relay apparatus according to the first embodiment.

FIG. 12 is a flowchart showing an example of a process procedure (modified example 2) for selecting a relay apparatus in the first embodiment. Since the process procedure from step S501 to S504 and step S513 of FIG. 12 are the same as those in FIG. 7 and FIG. 11, the description is not provided.

In step S523, the selection means 203 selects a relay apparatus 30 from among a plurality of relay apparatuses 30 existing in other installation sites by inquiring of other load distribution apparatuses 20 about a relay apparatus identifier of a relay apparatus 30 in which the load is equal to or less than a predetermined threshold.

When receiving a response, from every other load distribution apparatus 20, indicating that there is no relay apparatus 30 in which the load is equal to or less than the predetermined threshold, the selection means 203 may increase a new relay apparatus 30 by proceeding to step S514 of FIG. 11.

In step S524, the selection means 203 stores the session identifier generated in step S501 in a record of the relay apparatus 30 selected in step S523 of records of the relay apparatus information table.

In the above, the process procedure in the modified example 2 of the first embodiment has been described.

<Effect>

In the above, the communication system of the first embodiment is configured such that a relay apparatus inquiry request from the terminal 40 reaches the load distribution apparatus 20 installed in an installation site close to an area where the terminal 40 exists by using a technique such as IP Anycast. Also, the load distribution apparatus 20 that receives the relay apparatus inquiry request from the terminal 40 is configured to select a relay apparatus 30 installed in an installation site the same as the load distribution apparatus 20 itself. Accordingly, in the communication system of the first embodiment, it becomes possible to select a relay apparatus 30 such that delay of communication becomes small, and to properly perform load distribution of the relay apparatus 30. Also, the communication system of the first embodiment is configured such that, when selecting a relay apparatus 30, a relay apparatus 30 of small load is selected, for example. Accordingly, the communication system of the first embodiment can properly perform load distribution of the relay apparatus 30.

Also, the communication system of the first embodiment is configured to monitor load status of relay apparatuses 30 installed in an installation site the same as that of the load distribution apparatus itself, and to increase a new relay apparatus 30 when the load status is equal to or greater than a threshold. Also, the communication system of the first embodiment is configured to decrease an unnecessary relay apparatus 30 when the load of the relay apparatus 30 is equal to or less than a threshold. Accordingly, a relay apparatus 30 can be dynamically operated according to a necessary site and necessary time, so that unpredictable abrupt increase of load, and change of load depending on time slots can be flexibly handled.

Also, the communication system of the first embodiment is configured to be able to increase and decrease a relay apparatus 30 by using a cloud service. Accordingly, it becomes possible to cause only a minimally required relay apparatus 30 to operate, so that operating cost can be reduced.

Also, the communication system of the first embodiment is configured to notify a terminal 40 that receives a service using WebRTC of a proper TURN server. Accordingly, it is not necessary to set a TURN server beforehand in a client module distributed to the terminal 40 and in a program of the service providing apparatus 10 that distributes the client module, so that flexible service operation becomes possible.

Also, the communication system of the first embodiment (modified example 2) is configured such that, when load of each of all relay apparatuses 30 (or an average value of loads) installed in an installation site the same as that of the load distribution apparatus 20 exceeds a predetermined threshold, a relay apparatus 30 installed in an installation site different from that of the load distribution apparatus 20 can be selected instead of increasing a relay apparatus 30. Accordingly, cost necessary for increasing the relay apparatus 30 can be reduced.

[Second Embodiment]

Next, a communication system of the second embodiment is described. In the communication system of the second embodiment, when the load distribution apparatus 20 selects a relay apparatus 30, the load distribution apparatus 20 specifies an area where the terminal 40 exists from an IP address included in the relay apparatus inquiry request, and selects a relay apparatus 30 installed at a site corresponding to the specified area. Note that description for configuration parts the same as those of the first embodiment is not provided. Also, points that are not especially referred to may be the same as the first embodiment.

FIG. 13 is a diagram showing an example of a target area management table. The target area management table is stored in the storage means 202. The target area management table includes an installation site and target area information. The target area information is information that manages areas where terminals 40 for which relay of communication is performed exist. For example, as shown in FIG. 13, "Japan, Korea, China" is stored as target area information corresponding to "site A". That is, a relay apparatus 30 installed in the site A serves as a function for relaying communication of terminals 40 existing in Japan, Korea, and China.

It is desirable to set, as target area information, an area where a distance to an installation site is almost within a predetermined range, an area where communication with an installation site is available by a route of small number of hops of routing, an area where communication with an installation site is available by a route of small delay, an area where communication with an installation site is available by a route of wide band, an area where communication with an installation site is available by a route of stable communication quality, or an area where communication with an installation site is available by an economical route. Accordingly, it becomes possible to select a relay apparatus 30 installed in an area which is proper for an area where at least one terminal 40 of two terminals 40 that perform communication is installed, so that it can be avoided that delay increases due to a useless roundabout route of communication between terminals 40 via a relay apparatus 30, for example.

Figure 14:
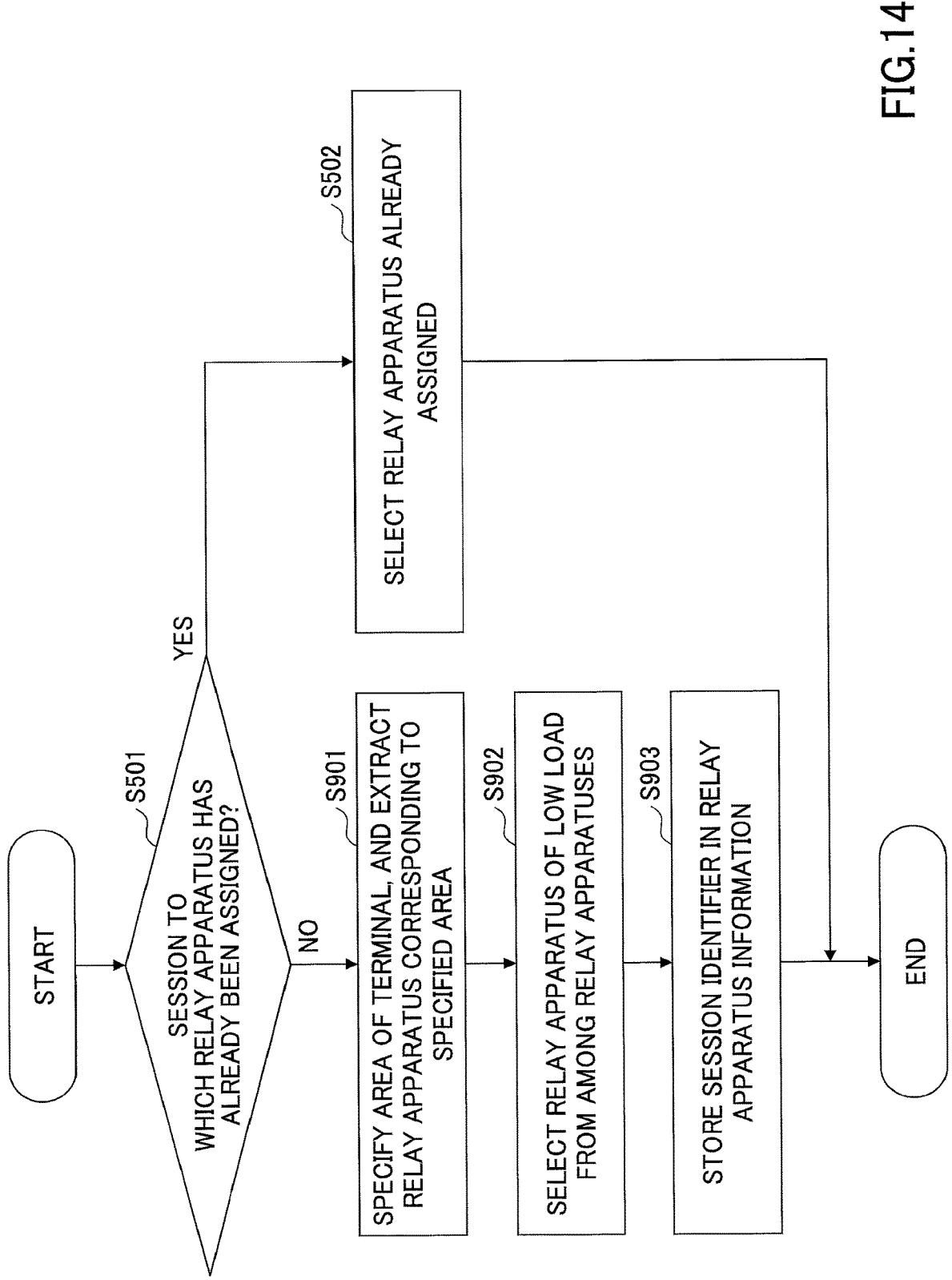
FIG. 14 is a flowchart showing an example of a process procedure for selecting a relay apparatus according to a second embodiment.

FIG. 14 is a flowchart showing an example of a process procedure for selecting a relay apparatus in the second embodiment. A process procedure for the load distribution apparatus 20 to select a relay apparatus 30 is described using FIG. 14. Since the process procedures of step S501 and step S502 are the same as those in FIG. 7, the description is not provided.

In step S901, the selection means 203 ascertains an area where the terminal 40 exists from header information included in a relay apparatus inquiry request received from the terminal 40.

Here, as the header information included in the relay apparatus inquiry request, there is an IP address. As for the IP address, an assignment range is determined to some extent for each country, and an assigned range is disclosed on the Internet and the like. Therefore, the selection means 203 can ascertain in which area the terminal 40 that transmits the relay apparatus inquiry request exists by using an IP address included in the header information of the relay apparatus inquiry request.

Next, the selection means 203 searches for an installation site corresponding to an area where the terminal 40 exists from the area management table and the relay apparatus management table to extract a relay apparatus 30 installed in the searched installation site.

In step S902, the selection means 203 selects a relay apparatus 30 of the lowest load from among relay apparatuses 30 extracted in step S901 using the load management information table, and transmits a relay apparatus identifier of the selected relay apparatus 30 to the terminal 40 that is a transmission source of the relay apparatus inquiry request received in step S501.

Note that, different from the first embodiment, it can be assumed that there is a case where the installation site searched in the process procedure of step S901 is not the same as an installation site of the load distribution apparatus 20 itself. Since the load management information table stored by the load distribution apparatus 20 itself does not include information on a relay apparatus 30 installed in an installation site different from the installation site of the load distribution apparatus 20 itself, the selection means 203 cannot continue the process. Therefore, in this case, the load distribution apparatus 20 may access another load distribution apparatus 20 installed in the installation site searched by the process procedure of step S901 to cause the other load distribution apparatus 20 to select the relay apparatus 30 of the lowest load.

In step S903, the selection means 203 stores the session identifier generated in step S501 in a record of the relay apparatus 30 selected in step S902 of records of the relay apparatus information table.

<Effect>

In the above, the communication system of the second embodiment is configured to manage areas where terminals 40 for which each relay apparatus 30 performs relay of communication exist, so as to select a relay apparatus 30 installed in an installation site close to an area where the terminal 40 exists in response to a relay apparatus inquiry request from the terminal 40. Accordingly, in the communication system of the second embodiment, it becomes possible to select a relay apparatus 30 such that delay of communication becomes small, so that it becomes possible to properly perform load distribution of relay apparatuses 30. Also, the communication system of the second embodiment is configured, when selecting a relay apparatus 30, to select a relay apparatus 30 in which load is small. Accordingly, the communication system of the second embodiment can properly perform load distribution of relay apparatuses 30.

[Third Embodiment]

Next, a communication system of the third embodiment is described. The communication system of the third embodiment selects a relay apparatus 30 of a predetermined site in response to a relay apparatus inquiry request from a specific terminal 40. Note that description for configuration parts the same as those of the first embodiment is not provided. Also, points that are not especially referred to may be the same as the first embodiment.

FIG. 15 is a diagram showing an example of a specific terminal management table. The specific terminal management table is stored in the storage means 202. The specific terminal management table includes an installation site and a terminal identifier.

Figure 16:
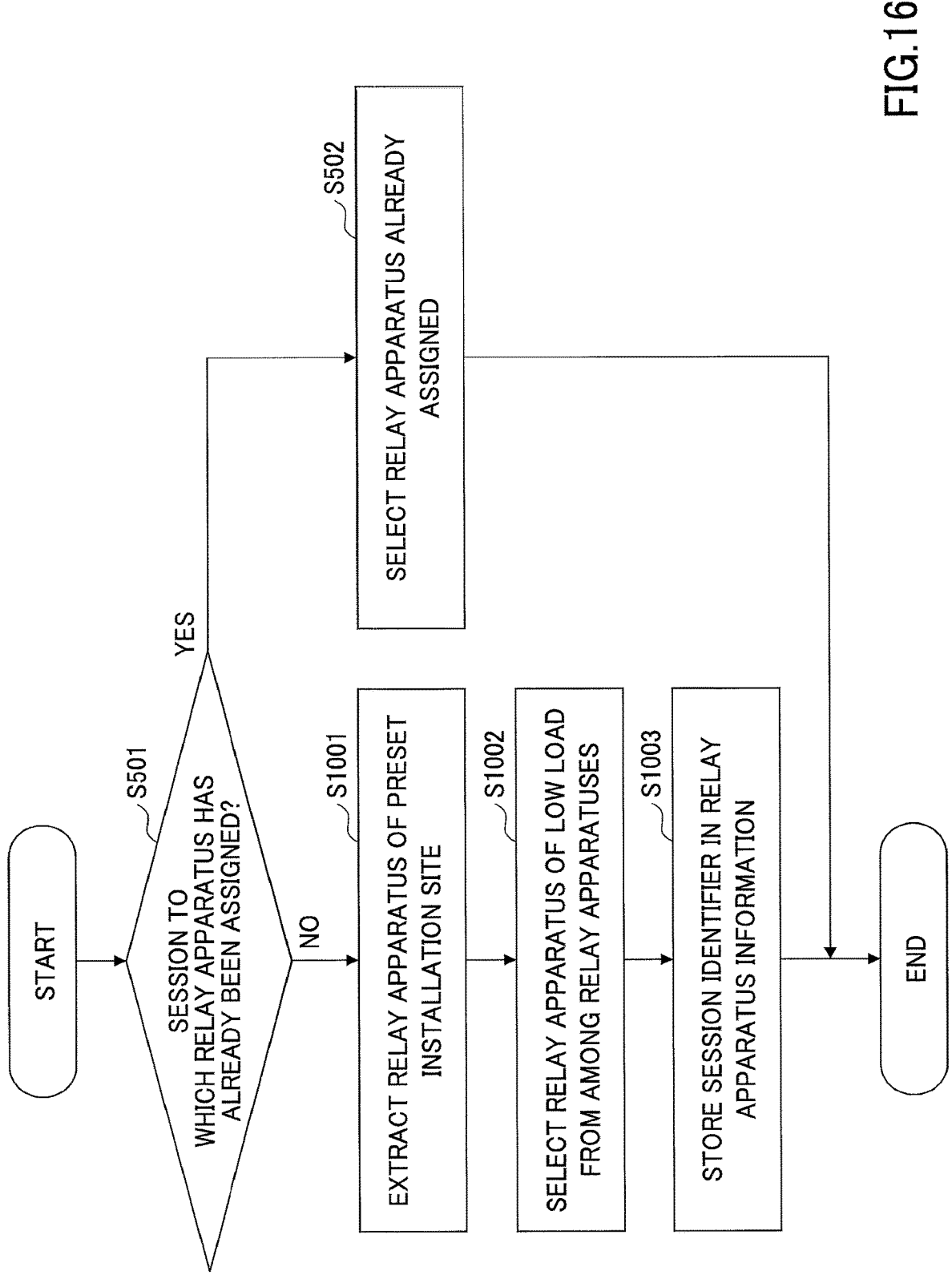
FIG. 16 is a flowchart showing an example of a process procedure for selecting a relay apparatus according to a third embodiment.

FIG. 16 is a flowchart showing an example of a process procedure for selecting a relay apparatus in the third embodiment. A process procedure for the load distribution apparatus 20 to select a relay apparatus 30 in the third embodiment is described using FIG. 16. Since the process procedures of step S501 and step S502 are the same as those in FIG. 7, the description is not provided.

In step S1001, the selection means 203 extracts a terminal identifier of the terminal 40 of the communication source included in the relay apparatus inquiry request received from the terminal 40, and searches for an installation site corresponding to the extracted terminal identifier from the specific terminal management table. When the extracted terminal identifier is registered in the specific terminal management table, the selection means 203 extracts a relay apparatus 30 installed in the searched installation site from the relay apparatus management table, and proceeds to the process procedure of step S1002. When the extracted terminal identifier is not registered in the specific terminal management table, the selection means proceeds to the process procedure of step S503 of FIG. 7 or to the process procedure of step S901 of FIG. 14.

In step S1002, the selection means 203 selects a relay apparatus 30 of the lowest load from among relay apparatuses 30 extracted in step S1001 using the load management information table, and transmits a relay apparatus identifier of the selected relay apparatus 30 to the terminal 40 that is a transmission source of the relay apparatus inquiry request received in step S501.

Note that, different from the first embodiment, it can be assumed that there is a case where the installation site searched in the process procedure of step S1001 is not the same as an installation site of the load distribution apparatus 20 itself. Since the load management information table stored by the load distribution apparatus 20 itself does not include information on a relay apparatus 30 installed in an installation site different from the installation site of the load distribution apparatus 20 itself, the selection means 203 cannot continue the process. Therefore, in this case, the load distribution apparatus 20 may access another load distribution apparatus 20 installed in the installation site searched by the process procedure of step S1001 to cause the other load distribution apparatus 20 to select the relay apparatus 30 of the lowest load.

In step S1003, the selection means 203 stores the session identifier generated in step S501 in a record of the relay apparatus 30 selected in step S1002 of records of the relay apparatus information table.

<Effect>

In the above, the communication system of the third embodiment is configured to select a relay apparatus 30 of a predetermined site in response to a relay apparatus inquiry request from a specific terminal 40. Accordingly, the communication system of the third embodiment can assign a preset relay apparatus 30 to a specific terminal. Also, for example, by installing a TURN server dedicated for a specific client, it becomes possible to select a fixed TURN server for a relay apparatus inquiry request from a terminal 40 of a specific client. Accordingly, flexible service deployment for needs of a part of users becomes possible.

<Supplement of Embodiment>

In the above, in the plurality of embodiments, the selection means 203 selects the same relay apparatus 30 for the same session, however, the selection means 203 may select a different relay apparatus 30 when areas where two terminals 40 exist respectively are separated. For example, in a case in which P2P communication is performed between a terminal 40 existing in America and a terminal 40 existing in Japan, the selection means 203 may select a relay apparatus 30 installed in the site C for a relay apparatus inquiry request from the terminal 40 existing in America, and may select a relay apparatus 30 installed in the site A for a relay apparatus inquiry request from the terminal 40 existing in Japan. The reason is that, in the current TURN protocol, it is necessary to select the same TURN server for the same session, however, in the future, it can be assumed that it becomes possible to select different TURN servers.

In the above, in the plurality of embodiments, a relay apparatus 30 is selected according to an area of the terminal 40 from which a relay apparatus inquiry request is received first, however, the load distribution apparatus 20 may wait until receiving relay apparatus inquiry requests from both of the terminal 40a and the terminal 40b to select a relay apparatus 30 of the lowest load from among relay apparatuses corresponding to both of respective areas of the terminal 40a and the terminal 40b.

In the above, in the plurality of embodiments, when the terminal 40 ends communication with another terminal 40, the terminal 40 may notify the load distribution apparatus 20 of it. Also, when the load distribution apparatus 20 receives the notification, the load distribution apparatus 20 may delete a session identifier stored in the relay apparatus information table.

In the above, the present invention is not limited to the plurality of embodiments, and various modifications and improvements are available within a range of the present invention.

In the above, in sequences and flowcharts described in the plurality of embodiments, order of processes may be changed in so far as there is no inconsistency.

In the above, all or a part of the plurality of embodiments may be implemented by a program. The program can be stored in a storage medium.

In the above, in the plurality of embodiments, an IP address is an example of header information, and a session identifier is an example of a communication identifier.

The present patent application claims priority based on Japanese patent application No. 2014-260297, filed in the JPO on Dec. 24, 2014, and the entire contents of the Japanese patent application No. 2014-260297 are incorporated herein by reference.

DESCRIPTION OF REFERENCE SIGNS 10 service providing apparatus
20 load distribution apparatus
30 relay apparatus
40 terminal
50 external network
60 NAT
70 internal network
201 communication means
202 storage means
203 selection means
204 load management means
205 increase and decrease means
206 synchronization means
401 relay means
402 load measurement means

The invention claimed is:

1. A load distribution apparatus connected, via a network, to a plurality of relay apparatuses that relay communication performed by a terminal, and to the terminal, the load distribution apparatus comprising:
storage circuitry configured to store relay apparatus identifiers that identify each of the plurality of relay apparatuses, installation site information that indicates installation sites of each of the plurality of relay apparatuses, load information that indicates loads of each of the plurality of relay apparatuses, and session information that uniquely identifies communication performed between the terminal and another terminal;
load management circuitry configured to collect the load information from each of the plurality of relay apparatuses to store the load information in the storage circuitry;
selection circuitry configured, when receiving a request from the terminal, to select a relay apparatus for relaying communication performed by the terminal from among the plurality of relay apparatuses based on the installation site information or the load information;
transmission circuitry configured to transmit, to the terminal that transmits the request, a relay apparatus identifier of the relay apparatus selected by the selection circuitry; and
synchronization circuitry configured to transmit a synchronization request to a plurality of other load distribution apparatuses and receive synchronization complete responses from the other load distribution apparatuses in response to the synchronization request, the synchronization request including at least the relay apparatus identifier and a session identifier registered for the relay apparatus.

2. The load distribution apparatus according to claim 1, wherein the selection circuitry is further configured to:
determine an area where the terminal exists from header information included in the request from the terminal or an installation site of the load distribution apparatus, and
select the relay apparatus for relaying the communication performed by the terminal from among the plurality of relay apparatuses based on the area where the terminal exists and the installation site information.

3. The load distribution apparatus according to claim 1, wherein the selection circuitry is further configured to select a relay apparatus from among the plurality of relay apparatuses that are installed in the same installation site based on the load information.

4. The load distribution apparatus according to claim 1, comprising:
increase and decrease circuitry configured to increase a new relay apparatus or decrease an installed relay apparatus based on the load information and a predetermined threshold.

5. The load distribution apparatus according to claim 4, wherein the selection circuitry is further configured, when a load of each of the plurality of relay apparatuses installed in a predetermined installation site exceeds a predetermined threshold, to instruct the increase and decrease circuitry to increase a new relay apparatus in the predetermined installation site, and to select the increased new relay apparatus.

6. The load distribution apparatus according to claim 1, wherein the selection circuitry is further configured, when a load of each of the plurality of relay apparatuses installed in a predetermined installation site exceeds a predetermined threshold, to select a relay apparatus that is equal to or less than the predetermined threshold from among the plurality of relay apparatuses installed in an installation site different from the predetermined installation site.

7. The load distribution apparatus according to claim 1, wherein the storage circuitry stores a communication identifier for identifying communication of the terminal by associating the communication identifier with a relay apparatus identifier, and
wherein, in a case in which the selection circuitry receives the request from the terminal,
when the communication identifier included in the request from the terminal is stored in the storage circuitry, the selection circuitry selects a relay apparatus that is identified by the relay apparatus identifier corresponding to the communication identifier,
when the communication identifier included in the request from the terminal is not stored in the storage circuitry, the selection circuitry selects a relay apparatus that relays communication performed by the terminal from among the plurality of relay apparatuses, and
the selection circuitry stores the communication identifier included in the request from the terminal in the storage circuitry by associating the communication identifier with the relay apparatus identifier of the selected relay apparatus.

8. The load distribution apparatus according to claim 7, wherein the synchronization circuitry is further configured to transmit the communication identifier stored in the storage circuitry and the relay apparatus identifier of the relay apparatus corresponding to the communication identifier to another load distribution apparatus that is different from the load distribution apparatus.

9. The load distribution apparatus according to claim 8, wherein, when the synchronization circuitry receives the communication identifier and a relay apparatus identifier of the relay apparatus from the other load distribution apparatus, the synchronization circuitry stores the received communication identifier in the storage circuitry by associating the received communication identifier with the relay apparatus indicated by the received relay apparatus identifier.

10. The load distribution apparatus according to claim 1, wherein the storage circuitry stores a terminal identifier for identifying the terminal and the installation site information by associating them, and
wherein, in a case in which the selection circuitry receives the request from the terminal,
when the terminal identifier included in the request from the terminal is stored in the storage circuitry, the selection circuitry extracts a relay apparatus installed in an installation site corresponding to the terminal identifier, and selects a relay apparatus that relays communication performed by the terminal from among the extracted relay apparatus based on the load information.

11. A load distribution method in a load distribution apparatus connected, via a network, to a plurality of relay apparatuses that relay communication performed by a terminal, and to the terminal, the load distribution method comprising:
storing, in storage circuitry, relay apparatus identifiers that identify each of the plurality of relay apparatuses, installation site information that indicates installation sites of each of the plurality of relay apparatuses, load information that indicates loads of each of the plurality of relay apparatuses, and session information that uniquely identifies communication performed between the terminal and another terminal;
collecting the load information from each of the plurality of relay apparatuses to store the load information in the storage circuitry;
when receiving a request from the terminal, selecting a relay apparatus for relaying communication performed by the terminal from among the plurality of relay apparatuses based on the installation site information or the load information;
transmitting, to the terminal that transmits the request, a relay apparatus identifier of the relay apparatus selected by selecting the relay apparatus;
transmitting a synchronization request to a plurality of other load distribution apparatuses, the synchronization request including at least the relay apparatus identifier and a session identifier registered for the relay apparatus; and
receiving synchronization complete responses from the other load distribution apparatuses in response to the synchronization request.

12. A non-transitory storage medium storing a program in a load distribution apparatus connected, via a network, to a plurality of relay apparatuses that relay communication performed by a terminal, and to the terminal, the program causing the load distribution apparatus to execute:
storing, in storage circuitry, relay apparatus identifiers that identify each of the plurality of relay apparatuses, installation site information that indicates installation sites of each of the plurality of relay apparatuses, load information that indicates loads of each of the plurality of relay apparatuses, and session information that uniquely identifies communication performed between the terminal and another terminal;
collecting the load information from each of the plurality of relay apparatuses to store the load information in the storage circuitry;
when receiving a request from the terminal, selecting a relay apparatus for relaying communication performed by the terminal from among the plurality of relay apparatuses based on the installation site information or the load information;
transmitting, to the terminal that transmits the request, a relay apparatus identifier of the relay apparatus selected by selecting the relay apparatus;
transmitting a synchronization request to a plurality of other load distribution apparatuses the synchronization request including at least the relay apparatus identifier and a session identifier registered for the relay apparatus; and
receiving synchronization complete responses from the other load distribution apparatuses in response to the synchronization request.

* * * * *